(12) United States Patent
Rozenberg et al.

(10) Patent No.: US 9,792,454 B2
(45) Date of Patent: Oct. 17, 2017

(54) RECORD LEVEL DATA SECURITY

(71) Applicant: Protegrity Corporation, Grand Cayman (KY)

(72) Inventors: Yigal Rozenberg, Wilton, CT (US); David Clyde Williamson, Great Missenden (GB)

(73) Assignee: Protegrity Corporation, Grand Cayman (KY)

( * ) Notice: Subject to any disclaimer, the term of this patent is extended or adjusted under 35 U.S.C. 154(b) by 124 days.

(21) Appl. No.: 14/993,949

(22) Filed: Jan. 12, 2016

(65) Prior Publication Data

US 2016/0210470 A1 Jul. 21, 2016

Related U.S. Application Data

(60) Provisional application No. 62/104,546, filed on Jan. 16, 2015.

(51) Int. Cl.
*G06F 17/30* (2006.01)
*G06F 21/62* (2013.01)

(52) U.S. Cl.
CPC .... *G06F 21/6218* (2013.01); *G06F 17/30315* (2013.01); *G06F 17/30424* (2013.01); *G06F 17/30598* (2013.01); *G06F 21/6227* (2013.01)

(58) Field of Classification Search
None
See application file for complete search history.

(56) References Cited

U.S. PATENT DOCUMENTS

| | | | |
|---|---|---|---|
| 8,935,802 B1 | 1/2015 | Mattsson et al. | |
| 2004/0044655 A1* | 3/2004 | Cotner | G06F 21/6227 |
| 2006/0053112 A1 | 3/2006 | Chitkara et al. | |
| 2006/0095791 A1 | 5/2006 | Wong | |
| 2007/0201700 A1 | 8/2007 | Hacigumus | |
| 2008/0033960 A1* | 2/2008 | Banks | G06F 17/30595 |
| 2009/0025057 A1 | 1/2009 | Mattsson | |
| 2011/0246788 A1 | 10/2011 | Dahl | |
| 2011/0302180 A1* | 12/2011 | Muller | G06F 17/30424 707/754 |

(Continued)

OTHER PUBLICATIONS

PCT International Search Report and Written Opinion, PCT Application No. PCT/US2016/013474, dated Mar. 17, 2016, 25 pages.

*Primary Examiner* — Fatoumata Traore
(74) *Attorney, Agent, or Firm* — Fenwick & West LLP

(57) ABSTRACT

A database security system protects a data table at both the column level and the individual data record level. Access to data records within the data table is governed by categories assigned to data records, by user roles assigned to users, and by a set of security access tables. A first access table maps data record identifiers to data record categories, data record protection schemes, and corresponding scheme keys. A second access table maps user roles to data record categories. A third access table maps column identifiers to column protection schemes and corresponding scheme keys. A fourth access table maps user roles to column identifiers. If a user requests access to a data record, the security access tables are queried using the data record identifier, the associated column identifier, and the user roles associated with the user to determine if the user can access the requested data record.

21 Claims, 7 Drawing Sheets

(56) References Cited

U.S. PATENT DOCUMENTS

2013/0086353 A1* 4/2013 Colgrove .............. G06F 3/0608
  711/206
2013/0298259 A1 11/2013 Mattsson et al.

* cited by examiner

| Data table 125 | | | | | |
|---|---|---|---|---|---|
| Employee ID 200 [ID: C115] | Salary 205 [ID: D254] | Age 210 [ID: E604] | SSN 215 [ID: F846] | Job title 220 [ID: G971] | |
| 1001 [ID: C222] | $50,000 [ID: D999] | 25 [ID: E123] | 111-11-1111 [ID: F987] | Analyst [ID: G101] |
| 1002 [ID: C444] | $30,000 [ID: D777] | 28 [ID: E456] | 222-22-2222 [ID: F654] | Housekeeper [ID: G202] |
| 1003 [ID: C666] | $80,000 [ID: D555] | 32 [ID: E789] | 333-33-3333 [ID: F321] | Intelligence Officer [ID: G303] |
| 1004 [ID: C888] | $40,000 [ID: D111] | 30 [ID: E000] | 444-44-4444 [ID: F000] | Administrator [ID: G404] |

| Data record identifier 300 | Data record category 305 | Data record protection scheme 310 | Protection scheme key 315 |
|---|---|---|---|
| C222 | SENSITIVE | ENCRYPTION | Key = 2468 |
| C444 | NORMAL | TOKENIZATION | Token table 1357 |
| C666 | SECRET | ENCRYPTION | Key = 8642 |
| C888 | SENSITIVE | HASHING | Algorithm 7531 |

Record identifier table 130

FIG. 3

RECORD LEVEL DATA SECURITY

CROSS REFERENCE TO RELATED APPLICATIONS

This application claims the benefit of and priority to U.S. Provisional Application No. 62/104,546 filed Jan. 16, 2015, which is incorporated by reference herein in its entirety.

FIELD OF ART

This disclosure relates to database security, and in particular, to record- and column-level security in a database system.

BACKGROUND

Large-scale data storage at data centers and warehouses poses myriad data security concerns, particularly if the stored data is sensitive. Data is often stored in data tables, and one or more security mechanisms can be implemented to protect such data. For instance, the data can be protected using encryption, tokenization, and other data transformation techniques. Such techniques protect the data, but can be overcome by an unauthorized entity that gains possession of an encryption key, a token table, and the like.

In some embodiments, data tables can be encrypted at the table level, while in other embodiments, column-level or row-level data protection can be implemented. However, in each of these schemes, the security settings do not follow data records when, for example, the data records are moved. Finally, these data security schemes do not accommodate changes in circumstance for particular users (e.g., when a user's security clearance level changes, when a user switches roles, etc.)

SUMMARY

A database security system protects data records in a data table at both the column-level and data record-level. Data records are associated with a unique data record identifier, a column identifier, and data record categories. Users who want to access data records in the system are associated with user roles such as "employee", "manager", "officer", and "executive". Each user role is mapped to one or more data record categories indicating varying levels of security such as "normal", "sensitive", "secret", and "confidential". Based on a user's role and the corresponding data record categories, the security system provides the user access only to the data records for which the user has appropriate clearance.

The security system uses multiple data tables to store the various mappings and protection data. A record identifier table maps each data record identifier to a data record category, data record protection scheme, and corresponding scheme key. More than one protection scheme and corresponding key may also be mapped to one data record identifier. Example protection schemes include encryption, tokenization, and hashing, each of which is associated with one or more corresponding encryption keys, token tables, hashing algorithms, and the like. A record role table maps each user role to data record categories. A column identifier table maps each data column identifier to one or more column protection schemes and corresponding scheme keys. A column role table maps each user role to data column identifiers.

When a user requests to access a data record, the system executes multiple queries to the data tables to determine if the user is allowed to decode and view the clear text in the data record. If the user is allowed at the column-level and data record-level, then the system retrieves the protection schemes and keys required to decode the column of the requested encoded data record and the requested data record itself. If a user's role changes, or a data records' categories change, then the system will automatically implement the new user role or data record categories without needing to relocate any of the data records or columns in the data table.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 2 illustrates a clear text data table within the environment of FIG. 1, according to one embodiment.

FIG. 3 illustrates a record identifier table for use within the environment of FIG. 1, according to one embodiment.

The figures (FIGS.) depict embodiments for purposes of illustration only. One skilled in the art will readily recognize from the following description that alternative embodiments of the structures and methods illustrated herein can be employed without departing from the principles of the invention described herein.

DETAILED DESCRIPTION

Reference will now be made in detail to several embodiments, examples of which are illustrated in the accompanying figures. It is noted that wherever practicable, similar or like reference numbers can be used in the figures and can indicate similar or like functionality. The figures depict embodiments of the disclosed system (or method) for purposes of illustration only. One skilled in the art will readily recognize from the following description that alternative embodiments of the structures and methods illustrated herein can be employed without departing from the principles described herein.

Record Level Data Protection Overview

Figure 1:
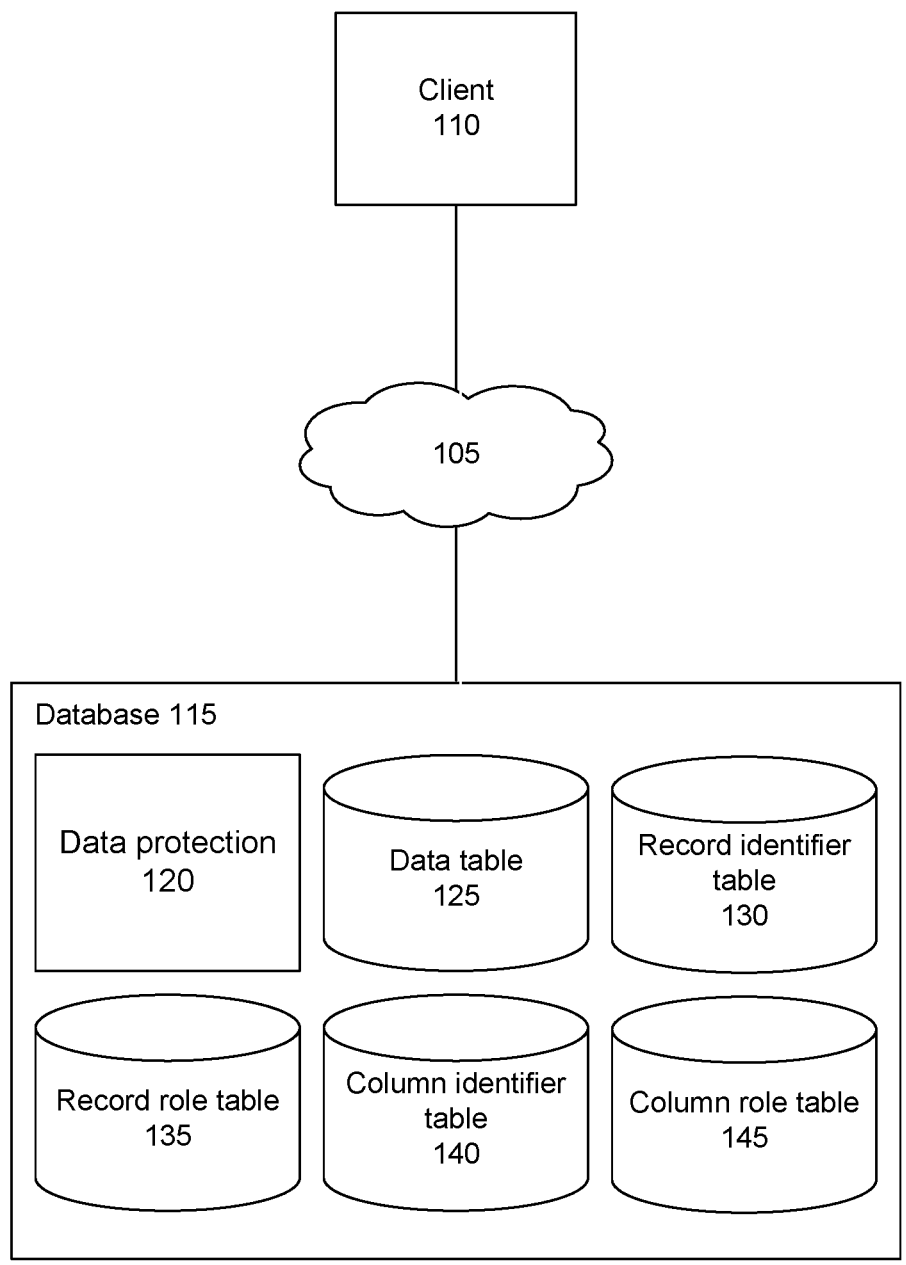
FIG. 1 illustrates a database environment for implementing record-level data security, according to one embodiment.

FIG. 1 illustrates a database environment for implementing record-level data security, according to one embodiment. The environment 100 of FIG. 1 includes a client 110 and a database 115, communicatively coupled via a network 105. Although only one client and one database are illustrated in the embodiment of FIG. 1, other embodiments can include any number of clients and/or databases.

The client 110 can be associated with a government organization, business, or other entity, though it should be noted that clients can also be associated with individual users. A client can receive sensitive data, for instance a users' account number, social security number, security clearance information, healthcare records, or the like during the course of an interaction with the user. The client can in turn provide the sensitive data to the database 115, for instance as a field within a data table 125 stored at the database. The database can be associated with an entity corresponding to the client, such as a government organization, a business, a web server, or the like.

The client 110 is a computing device capable of processing data as well as transmitting data to and receiving data from the database 115 via the network 105. For example, the client can include a desktop computer, laptop computer, smart phone, tablet computing device, server, terminal, or any other device having computing and data communication capabilities. Likewise, the database is a computing device configured to protect record-level data according to the principles described herein. Each computing device (such as the client and the database) includes one or more processors, memory, storage, and networking components, and is specially configured to perform the record-level data protection techniques described herein. The client is communicatively coupled to the network and can interact with the database using software such as a web browser or other application with communication functionality.

The network 105 connecting the various modules is typically the Internet, but can be any network, including but not limited to a local area network (LAN), metropolitan area network (MAN), wide area network (WAN), cellular network, wired network, wireless network, private network, virtual private network (VPN), direct communication line, and the like. The network can also be a combination of multiple different networks.

The database 115 includes a data protection engine 120, a data table 125, a record identifier table 130, a record role table 135, a column identifier table 140, and a column role table 145. The database can receive data from the client 110, for instance a data table or data record for insertion into one or more data table fields. Received data is stored in the data table 125. The data table is organized into one or more data rows and one or more data columns. Each data row can, for example, corresponding to a particular entity (such as an individual, an employer, a business, a group within an organization, a location, and the like). Each data column can, for example, correspond to a particular property or characteristic of the entity corresponding to the data row (for instance, a salary, an age, a social security number, a clearance level, and the like).

Within the data table 125, individual data records are stored in each database table column. Each data record can be associated with one or more data record categories, and each data record can be associated with a data record protection scheme and key used to protect the data record. Categories can include any suitable data categorization, such as categories describing a type of data ("sex offender data", "government finance data", "bank account data", etc.), categories describing a security level associated with the data ("normal", "sensitive", "secret", etc.), categories describing a source of data ("data from accountant", "data from stock broker", etc.), and the like. As described below, data records are mapped to data record categories, data record protection schemes, and protection scheme keys within the record identifier table 130.

Each data record category is associated with one or more user roles. As used herein, "role" refers to a status or classification of a user to which access to a particular data category is allowed. Example roles include a company employee, a company manager, a company executive, a lawyer, a soldier, a veteran, a police or intelligence officer, an agent of a government department, a family member, an account holder, or any other suitable status or classification of a user. In some embodiments, "role" merely refers to a security credential or status associated with a user. For instance, a data record category can be associated with a high security credential, and only users associated with or in possession of the high security credential can decode/access data records within the category. As described below, data record categories are mapped to user roles within the record role table 135.

Data records can be associated with multiple categories (and thus encoded using multiple data record protection schemes), in which case a user can only access the data records if the user satisfies at least one role associated with each of the multiple categories. For example, if a data record is associated with a "homeland security" data category and an "airline information category", if the "homeland security" data category is associated with the "police or intelligence officer" role and the "airline information category" is associated with the "agent of a government department" role, then the data record is protected with a first key associated with the "homeland security" data category, and with a second key associated with the "airline information category". Continuing with this example, a user that is associated with both the "police or intelligence officer" role and the "agent of a government department" role will be able to fully access/decode the record, and a user associated with only one of the two roles will not. Although the embodiment of FIG. 3 illustrates only one data record category mapped to each of the listed data record identifiers, this is done merely for the purposes of simplicity, and it should be noted that in other embodiments, a data record identifier can be mapped to multiple data record categories as described above.

In some embodiments, a data record associated with two or more data record categories is protected such that a first portion of the record is protected with a protection scheme key associated with a first category, a second different portion of the record is protected with a protection scheme key associated with the second category, and so forth. In such embodiments, a user associated with a first role associated with the first category can decode/access the first portion of the data record into clear text, but not the remaining portions. Alternatively, a record can be fully protected with all keys associated with categories associated with the record such that a user associated with some, but not all, of the roles associated with the categories cannot access any portion of the record in clear text.

Each column of data records in the database table can additionally be protected on a per-column basis using a column protection scheme and an associated protection scheme key. Although the term "column" is used herein for the purposes of simplicity, it should be noted that the methods described herein can refer to both a database table column in the traditional sense, as well as a set of multiple columns, a type of data (e.g., social security numbers, phone numbers, salary numbers, etc.) that may be stored within one or more columns, a subset of one or more columns (e.g., some but not all records within one or more columns), and the like.

Each column is protected with a column protection scheme and a protection scheme key corresponding to the column. As described below, columns are mapped to column protection schemes and protection scheme keys by the column identifier table 140. Each column is further associated with one or more roles describing a status or classification of a user to which access to the column is allowed. In some embodiments, the set of roles associated with the columns are the same as the set of roles associated with the data records described above, while in other embodiments, the sets of roles are different. A user associated with at least one role associated with a particular column can decode/access the column. As described below, columns are mapped to user roles by the column role table 145. Thus, in embodiments in which data table columns are encoded in addition to the encoding of the data records within the data table, in order for a user to access a particular data record, at least one of the roles associated with the user must 1) be associated with each categories associated with the data record, and 2) be associated with the column in which the data record is located.

FIG. 2 illustrates a clear text data table 125 within the environment of FIG. 1, according to one embodiment. Note that although FIG. 2 is shown with all data records in clear text, this is for the purposes of illustration only, and in reality, many if not all of the data records within the data table will be encoded according to one or more data record protection schemes and column protection schemes, and the data records themselves will not be stored in clear text for security purposes. In the embodiment of FIG. 2, there are five data columns: an employee ID column 200, a salary column 205, an age column 210, a social security number ("SSN") column 215, and a job title column 220. Each data column is associated with a data column identifier value unique to each data column. For example, the employee ID column 200 is associated with the ID "C115", the salary column 205 is associated with the ID "D254", the age column 210 is associated with the ID "E604", the SSN column 215 is associated with the ID "F846", and the job title column 220 is associated with the ID "G971".

Each data record within each column is associated with a data record identifier value unique to each data record. For example, the data record "1001" within the Employee ID column 200 is associated with the ID "C222". Likewise, this employee ID is associated with the data record "$50,000" within the salary column 205, which is associated with the ID "D999". Continuing with this example, this employee ID is associated with the data record "25" within the age column 210 (which is associated with the ID "E123"), the data record "111-11-1111" within the SSN column 215 (which is associated with the ID "F987"), and the data record "analyst" within the job title column 220 (which is associated with the ID "G101").

Four rows of data records are illustrated in the table in FIG. 2 across five columns, though other embodiments may include more or fewer rows and more or fewer columns. Further, the ID value associated with each data record is displayed in alphanumeric characters, though in other embodiments, data record ID values can use any set or format of characters, symbols, values, and the like, and can be any length or number of characters and/or symbols such that each data record can be uniquely identified by a corresponding unique identifier. Finally, the data record identifiers can be stored in conjunction with each data record, for instance in an adjacent memory location, within a same value stored in memory, with metadata of the data record, within a separate table mapping data records to data record identifiers, and the like.

It should be noted that although the description herein is limited to the storage of column identifiers and data record identifiers in conjunction with the columns and data records, respectively, of FIG. 2, in other embodiments, other types of data can be stored in conjunction with the columns and data records (for instance, in metadata associated with the columns and data records. Examples of such other types of data include but are not limited to: an identity of a last user to update a data record or column, a source of a data record, a timestamp representative of a time a column or data record was created or was last updated or accessed, a language associated with the data, a sort order associated with a column or data record, a search index associated with a column or data record, a hash value associated with a column or data record, statistical information associated with a column or data record, and the like. In some embodiments, such data can be included in one or more additional columns within, for instance, the record identifier table 130 or the column identifier table 140.

The data protection engine 120 protects data records in the data table 125 using one or more data protection schemes, such as encryption, tokenization, data masking, hashing, and the like. The data record protection schemes are selected based on the one or more categories corresponding to the data record, and all necessary data record keys (such as encryption keys, token tables, and the like) are stored, for instance, in the record identifier table in association with the data record (or the data record identifier). In some embodiments, as described below, the data protection engine 120 can additionally protect data columns within the data table 125 using one or more data protection schemes, for instance after data records within the data table 125 are protected. In such embodiments, each data column is protected using one or more column protection schemes based on the one or more categories corresponding to the data column, and all necessary column protection scheme keys are stored in, for instance, the column identifier table in associated with the data column (or the data record identifier).

The data protection engine 120 can generate and/or access a record identifier table 130 for use in implementing record-level data protection. The record identifier table 130 includes a column containing data record identifiers, and maps to each data record identifier, one or more data record categories, one or more data record protection schemes used to protect the data record, and one or more protection scheme keys used by the data record protection schemes. Each data record identifier within the record identifier table 130 matches the data record identifier for the corresponding data record within the data table 125. It should be noted that in some embodiments, the record identifier table 130 can map data records themselves (as opposed to data record identifiers) to categories, data record protection schemes, and protection scheme keys. Further, in other embodiments, protection scheme keys are stored in a separate table, beneficially introducing an additional layer of security. Finally, the record identifier table 130 can map data record identifiers to values in addition to those described herein. The data record protection scheme used to protect a data record can be selected based on the category mapped to the data record. For instance, a set of data record protection schemes can be associated with a particular data record category, and one or more of the set of data record protection schemes can be selected and used to protect the data record if the data record is mapped to the data record category.

FIG. 3 illustrates a record identifier table 130 for use within the environment of FIG. 1, according to one embodiment. In the embodiment of FIG. 3, there are four columns: a data record identifier column 300, a data record category column 305, a data record protection scheme column 310, and a protection scheme key column 315. In the embodiment of FIG. 3, the data record identifier column 300 includes each data record identifier associated with the employee ID column 200 of FIG. 2 (e.g., the IDs "C222", "C444", "C666", and "C888"). Each data record identifier is mapped to one or more categories within the data record category column 305 associated with the data record. For instance, the data record identifier "C222" is mapped to the data record category "sensitive". Each data record identifier is also mapped to a data record protection scheme within the data record protection scheme column 310 and a protection scheme key within the protection scheme key column 315 used to encode the data record corresponding to the data record identifier. For instance, the data record identifier "C222" is mapped to the data record protection scheme "encryption", and the protection key "key=2468". It should be noted that the record identifier table 130 can map multiple data record categories to a data record identifier, can map multiple data record protection schemes to a data record identifier (e.g., if multiple data record protection schemes are used to protect the data record), and can map multiple protection scheme keys to the data record identifier (if multiple protection scheme keys are used to protect the data record identifier). In some embodiments, the record identifier table 130 includes fewer, additional, or different columns and/or rows than those illustrated in the embodiment of FIG. 3.

The data protection engine 120 can generate and/or access a record role table 135 for use in implementing record-level data protection. The record role table 135 includes a column containing user roles, and maps each user role to zero, one, or more data record categories to which access for a user associated with the user role is allowed, such as the data record categories included within the record identified table 130. In order to access a particular data record associated with multiple categories, a user must be associated with at least one user role mapped to each data record category associated with the data record by the record role table 135.

Figure 4:
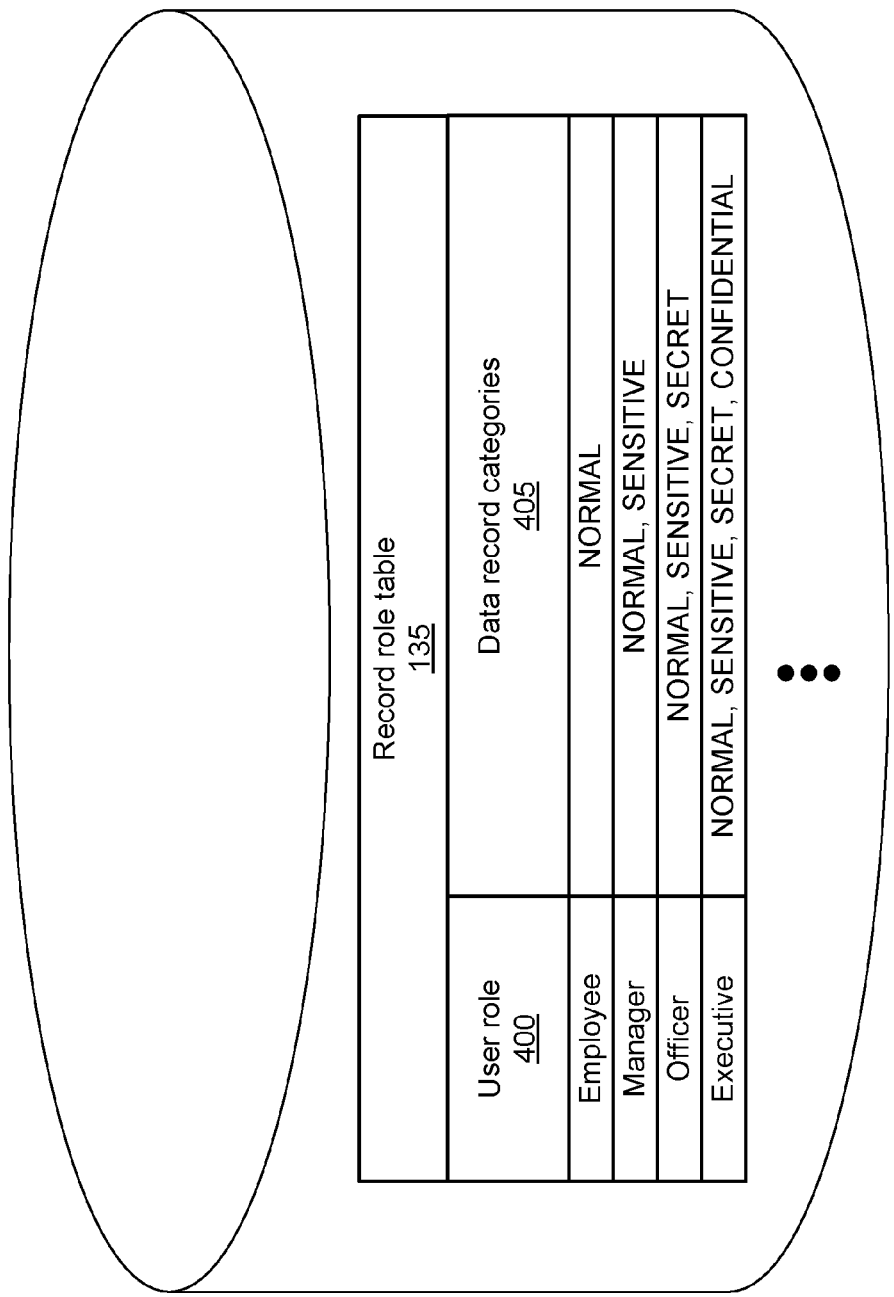
FIG. 4 illustrates a record role table for use within the environment of FIG. 1, according to one embodiment.

FIG. 4 illustrates a record role table for use within the environment of FIG. 1, according to one embodiment. In the embodiment of FIG. 4, there are two columns: a user role column 400 and a data record categories column 405. Each user role is mapped to zero, one, or more categories within the data record categories column 405. For instance, the user role "employee" is mapped to the data record category "normal", and the "manager" user role is mapped to the "normal" and "sensitive" data record categories. In some embodiments, the record role table 135 includes fewer, additional, or different columns and/or rows than those illustrated in the embodiment of FIG. 4.

The data protection engine 120 can generate and/or access a column identifier table 140 for use in implementing column-level data protection in conjunction with record-level data protection. The column identifier table 140 includes a column containing data column identifiers, such as the data column identifies included within the data table 125, and maps each data column identifier to one or more column protection schemes used to protect the associated data column, and one or more corresponding protection scheme keys used by the one or more data column protection schemes to protect the data column. As noted above, each data column within the data table 125 is associated with a data column identifier, and the one or more of the data column identifiers within the data table 125 are included within the column identifier table 140. It should be noted that in some embodiments, the column identifier table 140 can map data columns themselves (as opposed to data column identifiers) to data column protection schemes and corresponding protection scheme keys. Further, in other embodiments, protection scheme keys are stored in an additional and separate table from the column protection scheme or from the data column identifiers (for instance, a table mapping data column identifiers directly to protection scheme keys without column protection schemes, or a table mapping column protection schemes to protection scheme keys without data column identifiers), beneficially introducing an additional layer of security. Finally, the column identifier table 140 can map data columns identifiers to values in addition to those described herein.

Figure 5:
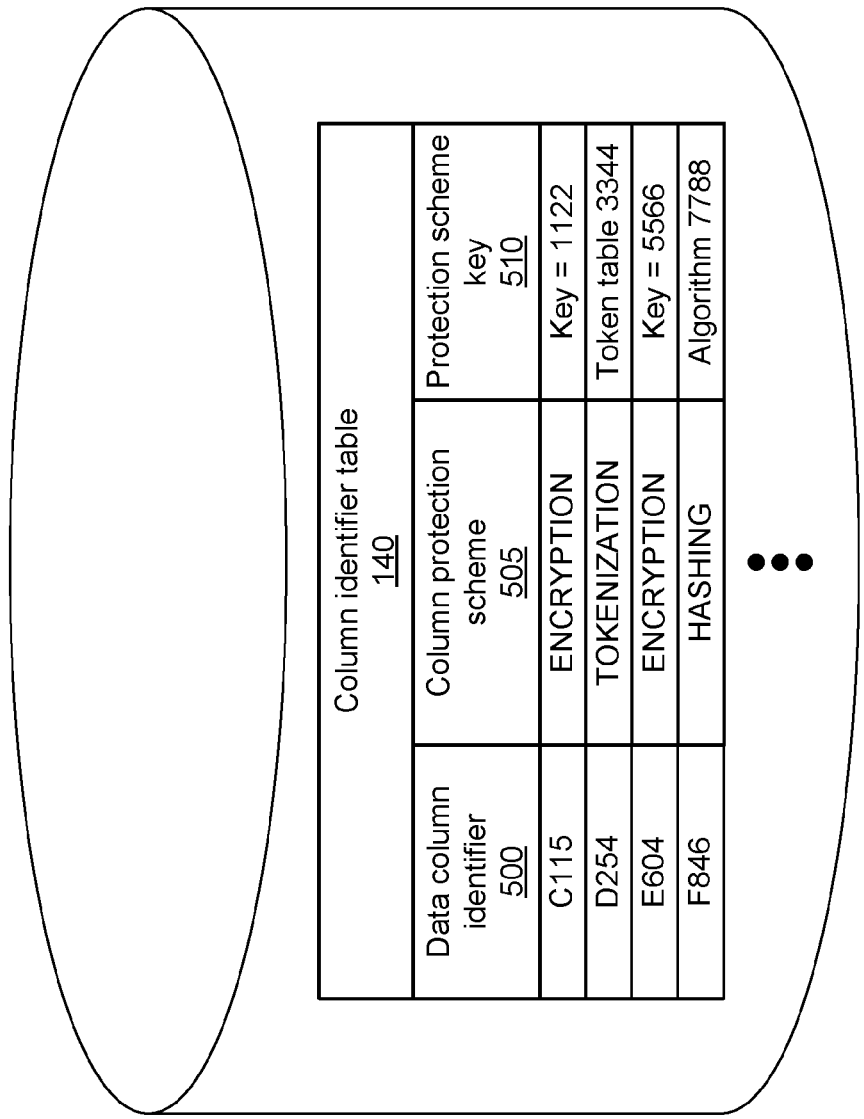
FIG. 5 illustrates a column identifier table for use within the environment of FIG. 1, according to one embodiment.

FIG. 5 illustrates a column identifier table for use within the environment of FIG. 1, according to one embodiment. In the embodiment of FIG. 5, there are three columns: a data column identifier column 500, a column protection scheme column 505, and a protection scheme key column 510. In the embodiment of FIG. 5, the data column identifier column 500 includes each data column identifier associated with the column IDs in FIG. 2 (e.g. the IDs "C115", "D254", "E604", "F846", and "G971"). Each data column identifier is mapped to a column protection scheme within the column protection scheme column 505 and a protection scheme key within the protection scheme key column 510 used to encode the data column corresponding to the data column identifier. For instance, the data column identifier "C115" is mapped to the column protection scheme "encryption" and the protection scheme key "key="1122". In other words, the column associated with the column identifier "C115" is encrypted using the encryption key "1122". Likewise, the data column identifier "D254" is mapped to the column protection scheme "tokenization" and the protection scheme key "token table 3344". In other words, the column associated with the column identifier "D254" is tokenized using token table #3344.

It should be noted that the column identifier table 140 can map multiple column protection schemes to a data column identifier (e.g., if multiple column protection schemes are used to protect the data column), and can map multiple protection scheme keys to the data column identifier (if multiple protection scheme keys are used by the one or more column protection schemes mapped to the data column identifier to protect the data column). Likewise, it should be noted that in embodiments where no column protection scheme is implemented (for instance, for data records in a column for which the applied data record protection schemes provide sufficient security), the column protection scheme entry within the column protection scheme column 505 mapped to the data column identifier by the column identifier table 140 can be empty. In some embodiments, the column identifier table 140 includes fewer, additional or different columns and/or rows than those illustrated in the embodiment of FIG. 5.

The data protection engine 120 can generate and/or access a column role table 145 for use in implementing column-level data protection in conjunction with record-level data protection. The column role table 145 includes a column containing user roles, and maps each user role to zero, one, or more data column identifiers to which access for a user associated with the user role is allowed. In order to access a particular data record within a particular column, a user must be associated with at least one user role mapped by the column role table 145 to the data column identifier associated with the particular column. It should be noted that in some embodiments, the set of user roles mapped to data column identifiers by the column role table 145 can be the same as or different from the set of user roles mapped to data record categories by the record role table 135. For instance, the sets of user roles can include zero, one, or more common user roles.

Figure 6:
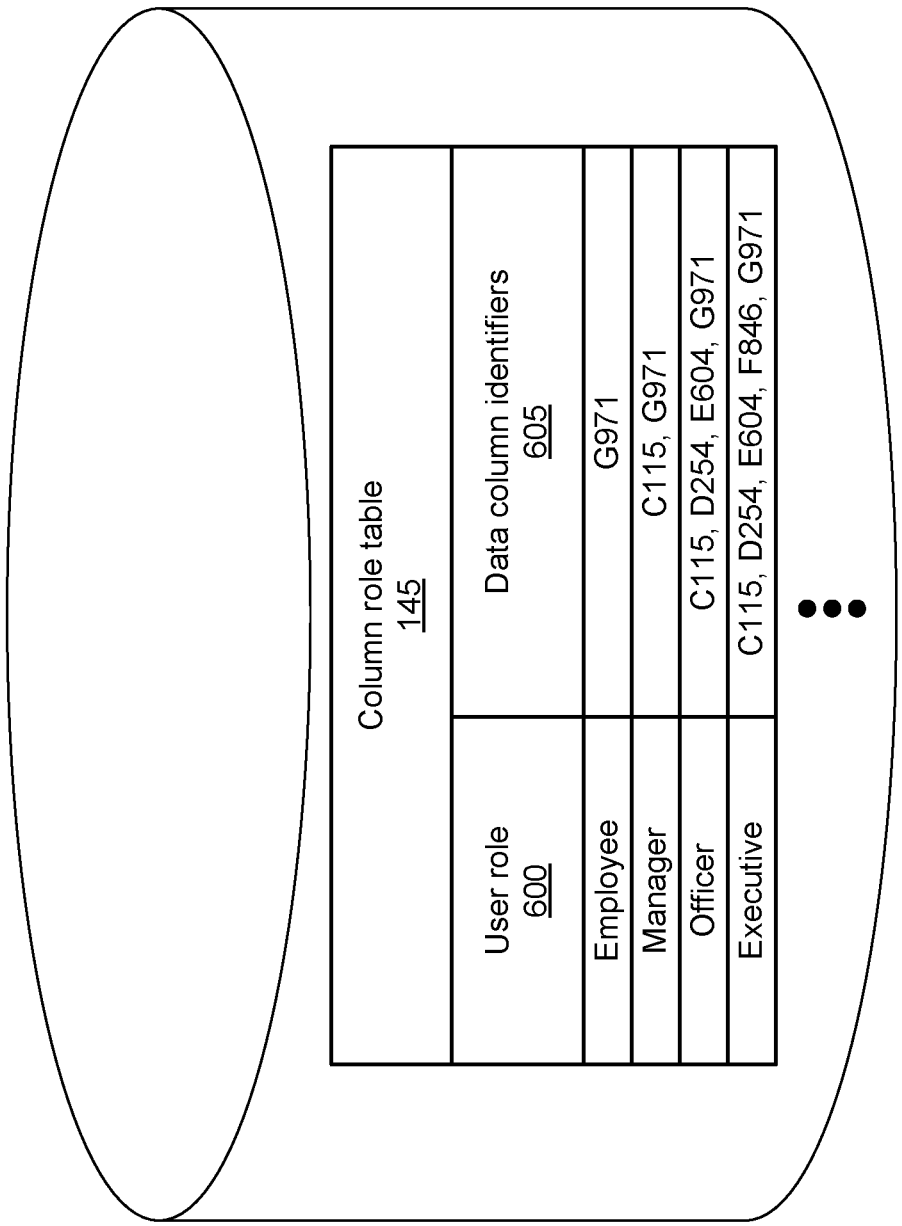
FIG. 6 illustrates a column role table for use within the environment of FIG. 1, according to one embodiment.

FIG. 6 illustrates a column role table for use within the environment of FIG. 1, according to one embodiment. In the embodiment of FIG. 6, there are two columns: a user role column 600 and a data column identifiers column 605. Each user role is mapped to zero, one, or more data column identifiers within the data column identifiers column 605. For instance, the user role "employee" is mapped to the data column identifier "G971", and the user role "manager" is mapped to the data column identifiers "C115" and "G971". In some embodiments, the column role table 145 includes fewer, additional, or different columns and/or rows than those illustrated in the embodiment of FIG. 6.

In order to access data, a user associated with the client 110 and associated with one or more user roles requests one or more data records from the database 115. In response to the request, the data protection engine 120 identifies, for each requested data record, an associated data record identifier and an associated data column identifier identifying the column in which the requested data is located. For instance in the embodiment of FIG. 2, if the data record requested by the user is the employee ID "1001", the data record identifier "C222" is identified and the data column identifier "C115" is identified.

The data protection engine 120 then queries the column role table 145 using the one or more user roles associated with the user to identify the set of data column identifiers mapped by the column role table 145 to the one or more user roles. For instance, if the user is associated with the "manager" user role, the data protection engine 120 queries the column role table 145 with the "manager" role and identifies the "C115" and "G971" data column identifiers mapped to the "manager" role.

In response to the identified set of data column identifiers including the identified data column identifier associated with the requested data record, the data protection engine 120 then queries the column identifier table 140 with the identified data column identifier to identify the one or more column protection schemes and the one or more protection scheme keys mapped to the identified data column identifier by the column identifier table 140. Continuing with the previous example, the data protection engine 120 queries the column identifier table 140 with the data column identifier "C115", and identifies the "encryption" column protection scheme and the protection scheme key "Key=1122". The protection engine 120 then decrypts the "C115" data column (or just the requested data record) within the data table 125 using the encryption key "1122". Although not illustrated in the embodiment of FIG. 2, the employee ID "1001", having been encoded with both one or more data protection schemes and one or more column protection schemes, after being decoded using the identified column protection scheme and corresponding protection scheme key, is still encoded by the one or more data protection schemes.

The data protection engine 120 then queries the record role table 135 using the one or more user roles associated with the user to identify a first set of data record categories mapped by the record role table 135 to the one or more user roles. Continuing with the previous example, if the user is associated with the "manager" user role, the data protection engine 120 queries the record role table 135 with the "manager" role and identifies the "normal" and "sensitive" data record categories mapped to the "manager" role. The data protection engine 120 additionally queries the record identifier table 130 with the identified data record identifier to identify a second set of data record categories mapped by the record identifier table to the identified data record identifier.

In response to each data record category in the second set of data record categories being included in the first set of data record categories, the data protection engine 120 then queries the record identifier table 130 with the identified data record identifier to identify the one or more data record protection schemes and the one or more protection scheme keys mapped to the identified data record identifier by the record identifier table. Continuing with the previous example, the data protection engine 120 queries the record identifier table 130 with the data record identifier "C222", and identifies the "encryption" data record protection scheme and the protection key "Key=2468". The protection engine 120 then decrypts the "C222" data record within the data table 125 using the encryption key "2468", producing the Employee ID value "1001", and allowing the user to access this value in plain text. It should be noted although the record identifier table 130 is queried in response to each data record category in the second set of data record categories being included in the first set of data record categories in the examples described herein, in some embodiments, the record identifier table 130 can be queried in order to decode a data record in response to any data record category in the second set of data record categories being included in the first set of data record categories.

In an example use case, James Bond is a low-level employee, and documents associated with his annual review are mapped to the data record category "sensitive". An analyst associated with the user roles mapped to the data record categories "normal" and "sensitive" can review James's annual review documents in clear text. James subsequently gets transferred to MI6, and his annual review documents are mapped instead to the data record category "secret". Within 24 hours, the Hadoop file system on which the annual review documents are stored reflects the change. The analyst is not associated with a user role mapped to the data record category "secret", and thus can no longer see James' annual review documents in clear text. Accordingly, the database environment described herein can beneficially accommodate changes in user role circumstances, changes in data record category circumstances, changes in encoding, and the like on a data record- or data column-basis without requiring the relocation or re-encoding of individual data records or data columns.

It should be noted that in some embodiments, data records within the data table 125 are first encoded using one or more data record protection schemes, and then columns of the data table 125 are encoded using one or more column protection schemes. In such embodiments, in order to provide an eligible user with access to a requested data record, the column in which the data record is located is first decoded using the column protection schemes, and then the data record itself is decoded using the data record protection schemes. In other embodiments, columns of the data table 125 are first encoded using one or more column protection schemes, and then data records of the data table 125 are encoded using one or more data record protection schemes. In such embodiments, in order to provide an eligible user with access to a requested data record, the data record itself is first decoded using the data record protection schemes, and then the column in which the data record is located is decoded using the column protection schemes.

Figure 7:
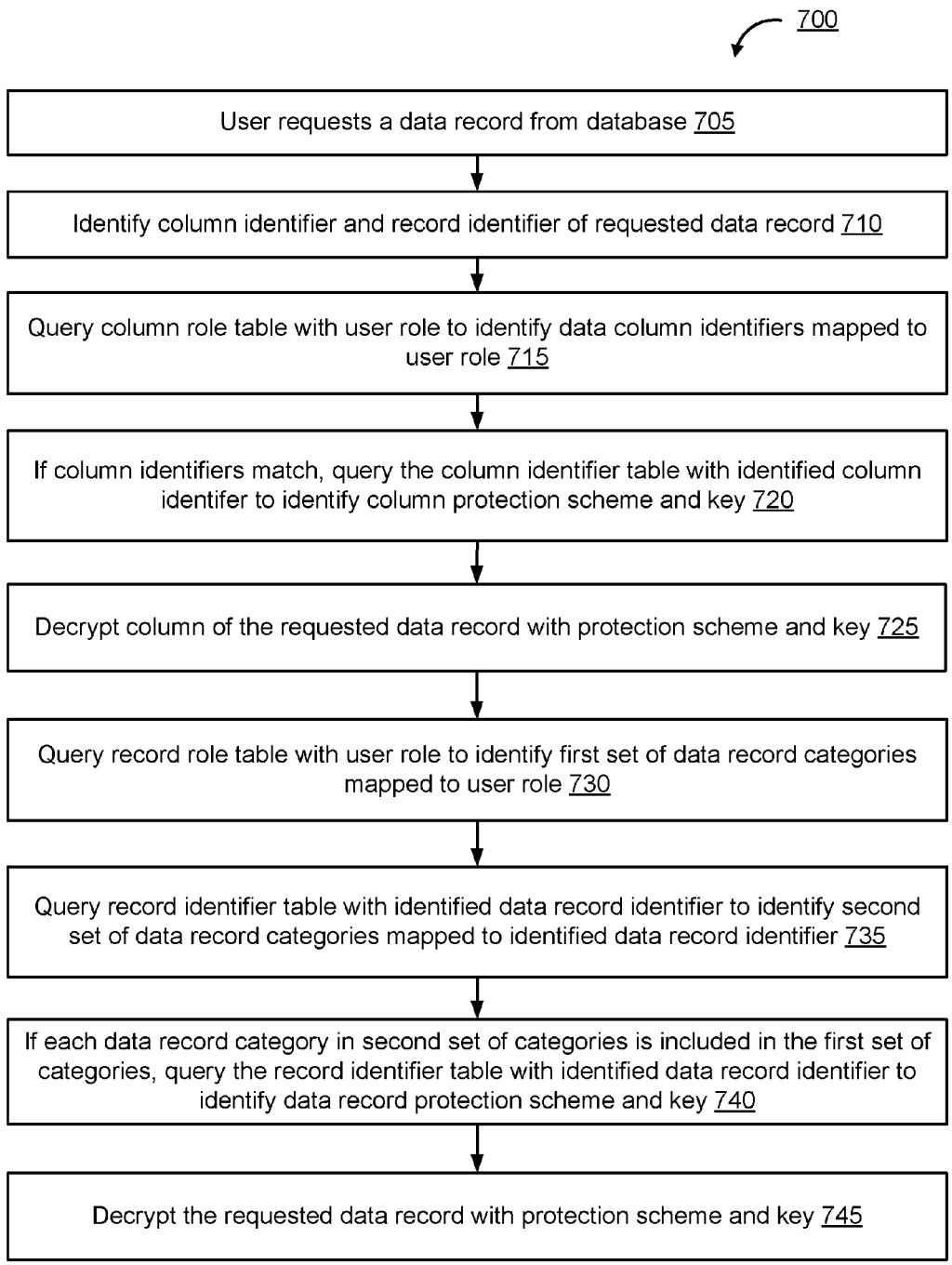
FIG. 7 is a flow chart illustrating a method for accessing data within the database environment of FIG. 1, according to one embodiment.

FIG. 7 is a flow chart illustrating a method 700 for accessing data within the database environment of FIG. 1, according to one embodiment. In the embodiment of FIG. 7, a user associated with one or more user roles requests 705 a data record from a database, the data record encoded using data record protection schemes and column protection schemes. The data record identifier and the column identifier associated with the requested data record are identified 710. A column role table is queried 715 using the one or more user roles to identify a set of data column identifiers mapped to the user role. If the set of data column identifiers includes the identified data column identifier, a column identifier table is queried 720 with the identified column identifier to identify a column protection scheme and corresponding protection scheme key. The column of the requested data record is decrypted 725 with the identified column protection scheme and protection scheme key to produce an intermediary encoded data record.

A record role table is queried 730 using the one or more user roles to identify a first set of data record categories mapped to the one or more user roles. A record identifier table is queried 735 using the identified data record identifier to identify a second set of data record categories mapped to the identified data record identifier. If each data record category in the second set of data record categories is included in the first set of data record categories, the record identifier table is queried 740 using the identified data record identifier to identify a data record protection scheme and corresponding protection scheme key. The intermediary encoded data record is then decrypted 745 using the identified data record protection scheme and corresponding protection scheme key to produce the unprotected/decoded requested data record. The requested data record is then provided to the requesting user.

Additional Configuration Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

It should be noted that various functionalities described herein may be combined in ways not explicitly described. For instance, data can be tokenized to include one or more use rules such that the resulting tokenized data fails a validation test and is verifiable. Thus, while self aware tokenization and verifiable tokenization are described separately, aspects of each may be performed in concert, and the resulting tokenized data can be both self aware tokenized data and verifiable tokenized data.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a non-transitory computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A database security system, comprising:
    a database table comprising encoded data records organized into columns, each data record associated with a data record identifier, a column identifier, and one or more data record categories;
    a column identifier table mapping each column identifier to one or more column protection schemes used to encode the corresponding data column and to one or more corresponding keys used by the one or more column protection schemes;
a column role table mapping user roles to one or more column identifiers;
a record identifier table mapping each data record identifier to one or more data record categories, one or more data record protection schemes used to encode the corresponding data record, and one or more corresponding keys used by the data record protection schemes to encode the data record;
a record role table mapping user roles to one or more data record categories;
an input configured to receive a request from a user associated with one or more user roles for access to a data record;
a data protection engine comprising one or more hardware processors and configured to:
  in response to a determination that at least one of the one or more user roles are mapped by the column role table to the column identifier associated with the requested data record, query the column identifier table to access the column protection schemes and corresponding keys, and decode the requested data record using the accessed column protection schemes and corresponding keys to produce an intermediate encoded data record; and
  in response to a determination that each of the one or more data record categories mapped to the data record identifier associated with the requested data record by the record identifier table are also mapped to one of the one or more user roles, query the record identifier table to access the data record protection schemes and corresponding keys and decode the intermediate encoded data record using the accessed data record protection schemes and corresponding keys to produce a decoded data record; and
an output configured to provide the decoded data record to the user.

2. The database security system of claim 1, wherein the data protection engine is configured to first encode data records within the database table using one or more data record protection schemes to produce intermediate encoded data records, and then is configured to encode intermediate data records within data table columns using one or more column protection schemes to produce the encoded data records.

3. The database security system of claim 1, wherein one or more of the column identifier table, the column role table, the record identifier table, and the record role table are stored in a separate database system than the database table.

4. The database security system of claim 1, wherein the column role table maps a first set of user roles to the one or more column identifiers, wherein the record role table maps a second set of user roles to one or more data record categories.

5. The database security system of claim 4, wherein the first set of user roles is equivalent to the second set of user roles.

6. The database security system of claim 4, wherein the first set of user roles includes at least one user role not included in the second set of user roles.

7. The database security system of claim 1, wherein at least one data record protection scheme or column protection scheme comprises encryption, and wherein a corresponding key comprises an encryption key.

8. The database security system of claim 1, wherein at least one data record protection scheme or column protection scheme comprises tokenization, and wherein a corresponding key comprises a token table identifier.

9. The database security system of claim 1, wherein at least one data record protection scheme or column protection scheme comprises a hash function, and wherein a corresponding key comprises a hashing algorithm.

10. The database security system of claim 1, wherein the data record identifiers and column identifiers are stored in an identifier table separate from the database table.

11. A method for database security, comprising:
receiving, by a database security system, a request from a user associated with one or more user roles for access to a data record stored in a database table, the database table comprising encoded data records organized into columns, each data record associated with a data record identifier, a column identifier, and one or more data record categories;
querying, by the database security system, a column role table mapping user roles to one or more column identifiers with the column identifier corresponding to the requested data record to identify a first subset of user roles mapped to the column identifier;
in response to a determination that the first subset of user roles includes at least one of the user roles associated with the user, querying, by the database security system, a column identifier table mapping each column identifier to one or more column protection schemes used to encode the corresponding data column and to one or more corresponding keys used by the one or more column protection schemes with the column identifier corresponding to the requested data record to access the column protection schemes and corresponding keys used to encode the requested data record;
decoding, by the database security system, the requested data record using the accessed column protection schemes and corresponding keys to produce an intermediate encoded data record;
querying, by the database security system, a record role table mapping user roles to one or more data record categories with the data record identifier corresponding to the requested data record to identify a second subset of user roles mapped to the data record identifier;
in response to a determination that each of the user roles in the second subset of user roles is also included in the user roles associated with the user, querying, by the database security system, a record identifier table mapping each data record identifier to one or more data record categories, one or more data record protection schemes used to encode the corresponding data record, and one or more corresponding keys used by the data record protection schemes to encode the data record with the data record identifier corresponding to the requested data record to access the data record protection schemes and corresponding keys used to encode the requested data record;
decoding, by the database security system, the intermediate encoded data record using the accessed data record protection schemes and corresponding keys to produce a decoded data record; and
outputting the decoded data record to the user.

12. The method of claim 11, wherein the data records within the database table are first encoded using one or more data record protection schemes to produce intermediate encoded data records, and the intermediate data records are then encoded using one or more column protection schemes to produce the encoded data records.

13. The method of claim 11, wherein one or more of the column identifier table, the column role table, the record identifier table, and the record role table are stored in a separate database system than the database table.

14. The method of claim 11, wherein the column role table maps a first set of user roles to the one or more column identifiers, wherein the record role table maps a second set of user roles to one or more data record categories.

15. The method of claim 14, wherein the first set of user roles is equivalent to the second set of user roles.

16. The method of claim 14, wherein the first set of user roles includes at least one user role not included in the second set of user roles.

17. The method of claim 11, wherein at least one data record protection scheme or column protection scheme comprises encryption, and wherein a corresponding key comprises an encryption key.

18. The method of claim 11, wherein at least one data record protection scheme or column protection scheme comprises tokenization, and wherein a corresponding key comprises a token table identifier.

19. The method of claim 11, wherein at least one data record protection scheme or column protection scheme comprises a hash function, and wherein a corresponding key comprises a hashing algorithm.

20. The method of claim 11, wherein the data record identifiers and column identifiers are stored in an identifier table separate from the database table.

21. A non-transitory computer-readable storage medium storing executable computer instructions that, when executed by a processor, perform steps comprising:
  receiving, by a database security system, a request from a user associated with one or more user roles for access to a data record stored in a database table, the database table comprising encoded data records organized into columns, each data record associated with a data record identifier, a column identifier, and one or more data record categories;
  querying, by the database security system, a column role table mapping user roles to one or more column identifiers with the column identifier corresponding to the requested data record to identify a first subset of user roles mapped to the column identifier;
  in response to a determination that the first subset of user roles includes at least one of the user roles associated with the user, querying, by the database security system, a column identifier table mapping each column identifier to one or more column protection schemes used to encode the corresponding data column and to one or more corresponding keys used by the one or more column protection schemes with the column identifier corresponding to the requested data record to access the column protection schemes and corresponding keys used to encode the requested data record;
  decoding, by the database security system, the requested data record using the accessed column protection schemes and corresponding keys to produce an intermediate encoded data record;
  querying, by the database security system, a record role table mapping user roles to one or more data record categories with the data record identifier corresponding to the requested data record to identify a second subset of user roles mapped to the data record identifier;
  in response to a determination that each of the user roles in the second subset of user roles is also included in the user roles associated with the user, querying, by the database security system, a record identifier table mapping each data record identifier to one or more data record categories, one or more data record protection schemes used to encode the corresponding data record, and one or more corresponding keys used by the data record protection schemes to encode the data record with the data record identifier corresponding to the requested data record to access the data record protection schemes and corresponding keys used to encode the requested data record;
  decoding, by the database security system, the intermediate encoded data record using the accessed data record protection schemes and corresponding keys to produce a decoded data record; and
  outputting the decoded data record to the user.

* * * * *